SATURABLE CORE START STOP CONTROLS FOR OSCILLATOR

Filed Oct. 22, 1965

INVENTOR
PHILIPPE DUVAUX
BY Paul M. Craig, Jr.
ATTORNEY

3,332,032
SATURABLE CORE START STOP CONTROLS FOR OSCILLATOR

Philippe Duvaux, Boulogne-sur-Seine, France, assignor to CIT—Compagnie Industrielle des Telecommunications, Paris, France Filed Oct. 22, 1965, Ser. No. 501,778
Claims priority, application France, Mar. 26, 1965, 10,890
8 Claims. (Cl. 331—112)

The present invention is directed to a self-energized magnetostatic relay which is particularly suitable as a control and storage device for electronic switching circuits, and more particularly, for use in the industries related to telecommunications, remote control, signaling, calculating machines, etc.

Applicant's prior U.S. Patent 2,946,896, entitled, "Magnetostatic Relays," discloses a magnetostatic relay wherein a magnetic amplifier is combined with a switching transistor to effect two position control. The magnetic amplifier in such combination comprises a core saturable magnetic material having various windings mounted thereon, such as a load winding one or more control windings, a polarization winding and, possibly, a reaction or bias winding.

The load winding is energized by an alternating voltage source and the control windings are traversed by direct current control signals. The output current of the magnetic amplifier which varies with the algebraic sum of the ampere turns supplied by the control windings energizes the transistor by way of the emitter or base circuit thereof. The device is such that when the output current of the magnetic amplifier exceeds a certain reference value, the transistor becomes conducting and supplies a constant direct saturation current; whereas, if the output current of the magnetic amplifier is smaller than the reference value, the transistor is blocked and supplies no current. These known magnetostatic relays operate perfectly and with a great security; they are, however, inconvenient since they require an alternating voltage source for the energization of the load winding of the magnetic amplifier. This inconvenience, apart from the substantial increase in the individual cost price of the relay, especially if one utilizes only a very small number thereof, also deprives it of its independence of utilization preventing it from universal application, such as, for example, the classical electromechanical relay enjoys.

The present invention has the object of creating a magnetostatic relay which does not have the inconvenience of requiring for the operation thereof an alternating voltage source but which offers by other means the same flexibility of utilization and the same performance as the magnetostatic relay of the known type to which reference has been made hereinabove.

It is another object of the present invention to provide a magnetostatic relay which is much simpler in construction than prior art devices of a similar nature and is consequently less expensive and more dependable.

It is a further object of the present invention to provide a magnetostatic relay which avoids the primary disadvantages heretofore inherent in such devices in a relatively simple manner without eliminating any of the advantageous characteristics of such prior devices.

The magnetostatic relay according to the present invention is remarkable particularly in that it comprises, on the one hand, a readily saturable magnetic circuit having an essentially rectangular hysteresis cycle and carrying several control windings, the control windings thereof being traversed by direct currents, each winding generating either negative or positive ampere turns depending upon the logical conditions of the circuit to be controlled and, on the other hand, it includes an oscillator whose positive coupling between input and output necessary to sustain oscillation is controlled by said saturable magnetic circuit in such a manner that the values of the coupling inductances between output and input thereof depend upon the magnetic state or condition of the saturate material.

According to another characteristic of the present invention, the oscillator comprises a transistor whose emitter is connected to a certain polarity, the collector being connected to the opposite polarity through a suitable load resistance, and two circuits in close magnetic coupling, one of these being connected to the collector of the transistor and comprising a condenser in series with an inductance, and the other circuit being connected to the base of the transistor and comprising only an inductance, the free extremities of these two inductances being connected to the same polarity as that of the emitter in such a manner that the oscillator is blocked when the magnetic circuit is saturated at which time the relay delivers an output current equal to zero, and the oscillator is in the working condition when the magnetic circuit is no longer saturated at which time the relay delivers a constant direct output current.

These and other objects, features, and advantages of the present invention will become more apparent from the following detailed description when taken in conjunction with the accompanying drawings which show various embodiments of the relay according to the present invention, and wherein.

Figure 1:
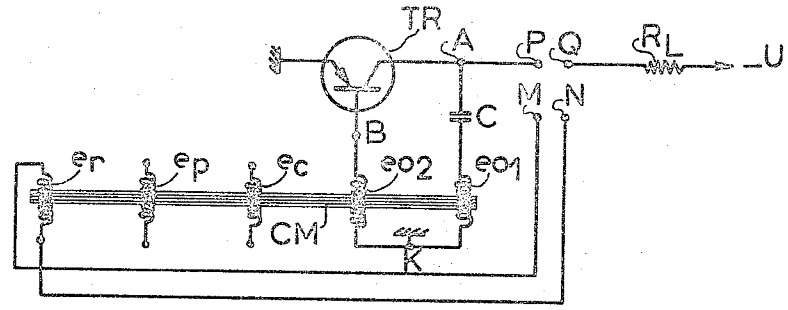
FIGURE 1 is a schematic circuit diagram of the relay according to the present invention.

In the embodiment shown in FIGURE 1, a magnetic circuit CM of any form, being easily saturable and having a rectangular hysteresis cycle is provided with several windings, including a polarization or bias winding $e_p$, one or several control windings $e_c$, possibly a reaction winding $e_r$ and two windings $eo_1$ and $eo_2$. Throughout the following description, the algebraic sum of the ampere-turns of the windings $e_r$, $e_p$ and $e_c$ will be called the "control ampere-turns" and is referred to hereinafter by the symbol $N_cI_c$ with the further addition of subscripts in certain instances to designate particular values of control ampere-turns at certain points on the operating curves of FIGURES 2, 3 and 5.

The windings $eo_1$ and $eo_2$ are connected at one corresponding extremity to a common point K connected to ground, the other extremity of the winding $eo_1$ being connected through a capacitor C to a point A at the collector of a transistor TR, whereas the other extremity of the winding $eo_2$ is connected directly to the base B of the transistor TR of the p-n-p junction type. The emitter of the transistor is connected to ground; the collector is normally connected by means of a strap between the point P and Q through a load resistance $R_L$ to a negative potential $-U$. It is possible, however, to eliminate the connection between P and Q and to provide a strap between P and M and a strap between Q and N if one desires to obtain reaction ampere turns in the winding $e_r$; the reaction may obviously be either positive or negative according to the direction of the path of the winding.

The transistor TR is provided with positive feedback from its output or collector circuit to its imput or base circuit by means of the magnetic coupling between windings $eo_1$ and $eo_2$ in these respective circuits. Thus the circuit including these elements will operate as an oscillator under proper conditions, i.e., if sufficient coupling is provided between the windings $eo_1$ and $eo_2$.

Since the introduction of the feedback winding $e_r$ in series with the load resistance only constitutes one form of the invention, it will be first assumed that the point P is connected to the point Q and that the connections MN and PQ are not established.

When the magnetic circuit CM is saturated by a suitable value of control ampere-turns, the relay is in the inoperative state, that is, it does not supply a current through load $R_L$, with the oscillator blocked by virtue of the insufficient coupling between windings $eo_1$ and $eo_2$. It is known, in fact, that at saturation, the variations of the current through one of the windings, $eo_1$ of the oscillator will not induce a current in the other winding $eo_2$ sufficient to sustain oscillations, the permeability of the magnetic material being very low under these conditions.

In order to start the oscillator, the magnetic circuit is desaturated by reducing the control ampere turns; the permeability will then abruptly assume a significant value and the mutual induction coefficient between the windings $eo_1$ and $eo_2$ will increase sharply. Electromotive forces are thus produced between the extremities of the windings $eo_1$ and $eo_2$ due to the rapid shift in saturation level, and since the windings are closely coupled the induced electromotive force in the winding $eo_2$ will be significant. More particularly, as a result of this induced electromotive force, point B at the base of the transistor may achieve a negative value sufficient to render the transistor conducting; the point A of the collector will then assume essentially the ground potential of the emitter. The result is that the condenser C which was charged by way of the path including the voltage source —U, the resistance $R_L$, the strap QP, the condenser C, the winding $eo_1$ and ground, finds at that instant a discharge path to ground through point A and transistor TR, the path further including winding $eo_1$, point K and ground.

Thus, the negative potential at point B due to the induced electromotive force at the moment of change of level of the saturation of the core is driven more negative due to the energy supplied by the discharge current of the condenser coupled between the windings $eo_1$ and $eo_2$. Since the potential of the base of the transistor varies between ground potential and a certain induced negative potential due to the capacitor charging or discharging current, the capacitor will experience a periodic charging and discharging in the form of oscillations which will maintain the transistor in a saturated condition. The transistor conducts for all values of bias of the base of the transistor lower than the ground potential of the emitter, which corresponds to at least 90% of the time between consecutive charges or discharges of the capacitor. During oscillation of the capacitor current, the base of the transistor will reach ground potential only when the charging or discharging current reaches zero, so that the transistor will be blocked only for a short time between charging and discharging cycles.

In summary, when the condenser is discharged, the base B once again reaches ground potential which produces blocking of the transistor. However, the condenser is recharged almost immediately from source —U and the recharge current produces an induced electromotive force at B which renders the transistor conducting once again. The condenser thus undergoes a series of small charges and discharges which entertain the oscillations; these are stopped only when the magnetic circuit becomes saturated, the coupling being practically suppressed at this time.

Figure 2:
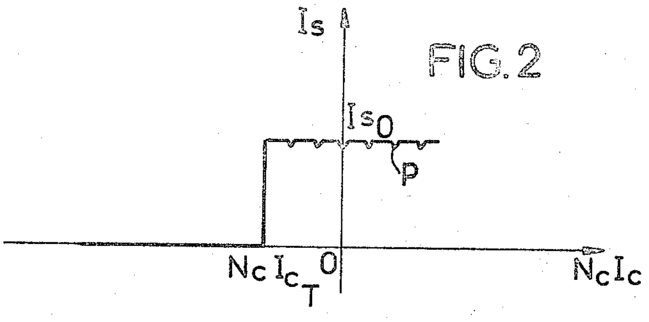
FIGURE 2 shows the form of the output current of the relay in response to control ampere-turns.

FIGURE 2 shows the form of the output current of the relay $I_s$ as a function of the controlling ampere turns $N_cI_c$ in the magnetic circuit. The current is zero for controlling ampere turns smaller than a certain threshold value $N_cI_c$ (T); for ampere turns greater than $N_cI_c$ (T) the output current assumes a certain value $I_{so}$ which is essentially constant. One will note, however, small points $p$ having a very low amplitude which corresponds to instants where the transistor no longer operates at saturation; between periods of charging and discharging of the capacitor C the interval between two consecutive points corresponds to the period of the high frequency current of the oscillator.

Figure 3:
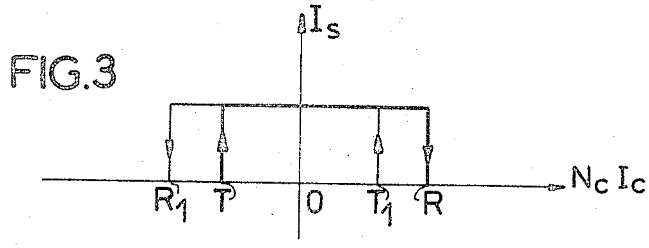
FIGURE 3 shows the positions of rising and falling of the relay depending on the control ampere turns.

FIGURE 3 shows a cycle of rising and falling of the relay according to the present invention as a function of the controlling ampere turns $N_cI_c$. When the controlling ampere turns are caused to increase from the left toward the right, the relay output current $I_s$ rises for a certain threshold value T of the controlling ampere turns for which there is no saturation of the magnetic circuit. If these controlling ampere turns are further caused to increase, there is produced a saturation of the magnetic circuit and the relay output current $I_s$ will fall back for a certain value R of the ampere turns $N_cI_c$.

Conversely, if one causes the controlling ampere turns to decrease by going from the right toward the left, the magnetic circuit is desaturated and the relay output current rises for a certain value $T_1$ of the ampere turns being smaller than R; and if one continues to cause the ampere turns to decrease, starting from point O, they assume a negative value and the magnetic circuit is saturated once again negatively. For a value $R_1$ of the negative ampere turns lower than T, the relay output current falls back.

For each of the values $-B_o$ and $+B_o$ of the magnetic induction, there is thus a value of the ampere turns $N_cI_c$ causing the saturation. In order not to multiply the conditions imposed upon the controlling ampere turns, it will obviously be desirable that points $R_1$ and T will be very close with respect to one another for the negative ampere turns and that points $T_1$ and R be very close with respect to one another for the positive ampere turns the direction of variation of the ampere turns $N_cI_c$ then determining if the relay output current is rising or falling.

Figures 4, 5:
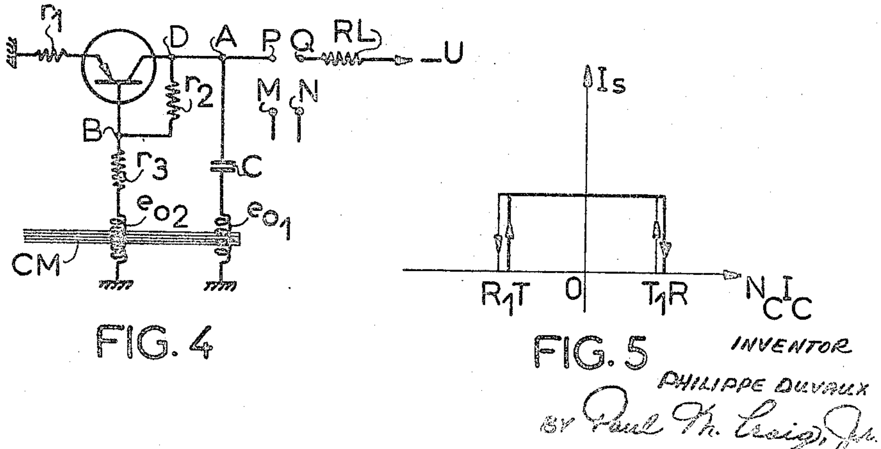
FIGURE 4 shows a modification of the relay of FIGURE 1 according to the present invention.
FIGURE 5 illustrates the positions of rising and falling of the relay of FIGURE 4 varying in accordance with the control ampere turns.

FIGURE 4 is a modification of the relay of FIGURE 1, according to the present invention, making it possible to substantially merge the points $R_1$ and T, and $T_1$ and R (FIGURE 5). This assembly is distinguished from that according to FIGURE 1 in that there is inserted a resistance $r_1$ between the emitter and ground, a resistance $r_2$ between the base and the collector and a resistance $r_3$ in series with the base and with the winding $eo_2$, all of the other elements of the assembly or installation being identical to those in FIGURE 1.

Under these conditions, it is obvious that in the inoperative state of the transistor, a current passes in the circuit —U, resistance $R_L$, strap PQ, resistance $r_2$, resistance $r_3$, winding $eo_2$ and ground. However, the resistance $r_2$ being very large and much more significant than the resistance $r_3$, it is evident that the current in this path will be very low, such that the point D will remain substantially at the potential —U whereas the point B of the base will be very slightly negative in such a manner as to render the transistor very lightly conducting. The device under these conditions being in a well-defined position of equilibrium, is much less sensitive to the operational variations due to the normal dispersion of the characteristics of the components and particularly of the transistor than is the circuit of FIGURE 1.

FIGURE 5 illustrates the cycle of rising and falling of the relay output current $I_s$ related to the circuit of FIGURE 4; it will be noted therefrom that the points $R_1$ and T are positioned very close together in the same manner as $T_1$ and R which practically allows for the control of the device with a single negative value of the controlling ampere turns and a single positive value thereof.

It is evident that one may impart to the rising relay current a storage by utilizing the reaction winding $e_r$ yielding a positive reaction; this may allow the relay current to rise with one pulse, the output current then supplying the ampere turns necessary to maintain it. In this case, a connection is effected between the terminals PM and QN to place the winding $e_T$ in series with the load $R_L$.

On the other hand, one will not depart from the spirit and scope of the present invention by utilizing, instead of PNP transistors, NPN transistors, or by providing modifications in the installation while preserving the principle of the saturable magnetic circuit carrying the coupling or connecting windings of the oscillator.

The charge resistance of the device may be utilized either completely or partially to constitute a control winding in series which may, in turn, influence several other similar devices comparable to the one which has been described hereinabove.

While I have shown and described several embodiments in accordance with the present invention, it is understood that the same is not limited thereto but is susceptible of numerous changes and modifications as known to a person skilled in the art and I therefore do not wish to be limited to the details shown and described herein, but intend to cover all such changes and modifications as are encompassed by the scope of the appended claims.

I claim:

1. A magnetostatic relay comprising
magnetic circuit means including a saturable core and at least one control winding for effecting variable saturation of said core, and
transistor oscillator means including means effecting magnetic coupling between the output and input thereof via said magnetic circuit means, the degree of said coupling being controlled by the saturation of said magnetic circuit means, said transistor oscillator means providing the sole source of alternating voltage applied to said saturable core,
said transistor oscillator means including a transistor, a bias voltage source, the emitter of said transistor being connected to ground, a load resistance connected between the collector of said transistor and said bias voltage source, a first circuit including in series a capacitor and a first winding positioned on said saturable core connecting said collector to said emitter, and a second circuit consisting of a second winding positioned on said saturable core connected directly between said emitter and the base of said transistor.

2. A magnetostatic relay as defined in claim 1 further including a first resistance connected between the emitter of said transistor and said one side of said voltage source, a second resistance connected between the base and the collector of said transistor, and a third resistance connected to the base of said transistor in series with said second winding, said second resistor and said third resistor being proportioned such that in the non-conducting state of said transistor a slight leakage current passes said transistor.

3. A magnetostatic relay as defined in claim 2 wherein said second resistor is of considerably greater value than said third resistor.

4. A magnetostatic relay as defined in claim 1 further including only a reactance winding connected in series with said load resistance to the collector of said transistor.

5. A magnetostatic relay as defined in claim 4 further including means connected to the collector and base of said transistor for permitting a slight leakage current to flow through said transistor in the inoperative or non-conducting state of said relay.

6. A magnetostatic relay as defined in claim 1 further including means connected to the collector and base of said transistor for permitting a slight leakage current to flow through said transistor in the inoperative or non-conducting state of said relay.

7. A magnetostatic relay as defined in claim 6 wherein said means for permitting a leakage current to flow through said transistor includes a first resistor connected between the base and the collector of said transistor and a second resistor connected to the base of said transistor in series with said second winding.

8. A magnetostatic relay as defined in claim 7 wherein said first resistor is of considerably greater value than said second resistor.

References Cited

UNITED STATES PATENTS

| | | | |
|---|---|---|---|
| 2,978,614 | 4/1961 | Bauman | 331—112 |
| 3,139,595 | 6/1964 | Barber | 331—112 |
| 3,217,171 | 11/1965 | Corey | 331—113.1 |

FOREIGN PATENTS

| | | |
|---|---|---|
| 897,569 | 5/1962 | Great Britain. |
| 953,359 | 3/1964 | Great Britain. |
| 155,334 | 11/1962 | Russia. |

ROY LAKE, *Primary Examiner.*

JOHN KOMINSKI, *Examiner.*